(12) United States Patent
Eller et al.

(10) Patent No.: US 10,370,190 B2
(45) Date of Patent: Aug. 6, 2019

(54) SYSTEMS AND METHODS FOR CAPPING

(71) Applicant: Express Scripts, Inc., St. Louis, MO (US)

(72) Inventors: Charles E. Eller, Lake St. Louis, MO (US); Jacob J. Reinhardt, Wentzville, MO (US); Thomas C. Pegg, West Olive, MI (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 656 days.

(21) Appl. No.: 14/799,881

(22) Filed: Jul. 15, 2015

(65) Prior Publication Data

US 2015/0314900 A1 Nov. 5, 2015

Related U.S. Application Data

(63) Continuation of application No. 13/412,584, filed on Mar. 5, 2012, now Pat. No. 9,133,002.

(Continued)

(51) Int. Cl.
| | |
|---|---|
| *B65B 7/28* | (2006.01) |
| *B65G 1/137* | (2006.01) |
| *B65B 57/02* | (2006.01) |
| *B65B 43/52* | (2006.01) |
| *G06F 7/00* | (2006.01) |

(Continued)

(52) U.S. Cl.
CPC .............. *B65G 1/1378* (2013.01); *B07C 3/00* (2013.01); *B07C 5/34* (2013.01); *B07C 5/3412* (2013.01); *B07C 5/36* (2013.01); *B07C 5/361* (2013.01); *B07C 5/38* (2013.01); *B21B 41/00* (2013.01); *B65B 5/04* (2013.01); *B65B 7/2807* (2013.01); *B65B 7/2842* (2013.01); *B65B 43/52* (2013.01); *B65B 57/02* (2013.01); *B65G 1/1373* (2013.01); *B67B 3/02* (2013.01); *B67B 3/06* (2013.01); *B67B 3/26* (2013.01); *G06F 7/00* (2013.01); *G06Q 10/087* (2013.01)

(58) Field of Classification Search
CPC ....... B65B 7/2807; B65B 7/2842; B65B 7/28; B65B 5/04
USPC .................................................. 53/476, 485
See application file for complete search history.

(56) References Cited

U.S. PATENT DOCUMENTS

| | | | | |
|---|---|---|---|---|
| 2,031,735 A | * | 2/1936 | Risser | ................... B67B 3/2033 279/37 |
| 3,612,320 A | * | 10/1971 | Wassilieff | .......... B65D 41/0435 215/316 |

(Continued)

*Primary Examiner* — Chelsea E Stinson
(74) *Attorney, Agent, or Firm* — Armstrong Teasdale LLP

(57) ABSTRACT

Method and systems for capping are described. In one embodiment, an order processing device, a cap device, a plurality of feeders and a capping implement are provided. The order processing device processes orders with containers. The cap device is adapted to cap the container and is communicatively connected to the order processing device. The cap device is adapted to receive dispensation preferences from the order processing device. The cap device includes a plurality of feeders and a capping implement. Each feeder has a unique type of crown portion of a cap for capping. The capping implement is adapted to grasp the crown portion from the feeder. The cap device is adapted to select a feeder from which to grasp the crown portion based on the dispensation preferences. Additional methods and systems are disclosed.

19 Claims, 13 Drawing Sheets

Related U.S. Application Data

(60) Provisional application No. 61/449,523, filed on Mar. 4, 2011.

(51) Int. Cl.
*B07C 3/00* (2006.01)
*B07C 5/34* (2006.01)
*B21B 41/00* (2006.01)
*B07C 5/36* (2006.01)
*B07C 5/38* (2006.01)
*B67B 3/02* (2006.01)
*B67B 3/06* (2006.01)
*B67B 3/26* (2006.01)
*B65B 5/04* (2006.01)
*G06Q 10/08* (2012.01)

(56) References Cited

U.S. PATENT DOCUMENTS

| | | | | |
|---|---|---|---|---|
| 3,771,284 A * | 11/1973 | Boeckmann | ......... | B67B 3/2033 53/282 |
| 6,044,626 A * | 4/2000 | Harper | ......... | B67B 3/2066 53/317 |
| 6,250,046 B1 | 6/2001 | VandeGeijn | | |
| 6,341,472 B1 * | 1/2002 | Schroeder | ......... | B67B 3/003 53/306 |
| 6,494,017 B1 | 12/2002 | McGrath et al. | | |
| 6,871,482 B2 * | 3/2005 | Cirio | ......... | B67B 3/2086 53/317 |
| 6,874,301 B2 * | 4/2005 | Kitamoto | ......... | B67B 3/20 53/317 |
| 7,313,898 B1 * | 1/2008 | Eller | ......... | B65B 21/06 108/153.1 |
| 7,770,358 B2 * | 8/2010 | Sink | ......... | B65B 7/2835 53/317 |
| 7,770,364 B1 * | 8/2010 | Leu | ......... | B65B 5/045 53/287 |
| 7,836,664 B2 * | 11/2010 | Zanini | ......... | B67B 3/2033 53/284.5 |
| 2001/0018820 A1 | 9/2001 | Kitamoto | | |
| 2003/0154688 A1 * | 8/2003 | Lang | ......... | B67B 3/2033 53/75 |
| 2006/0231519 A1 * | 10/2006 | Py | ......... | B65D 51/002 215/342 |
| 2007/0158357 A1 * | 7/2007 | Yuyama | ......... | B65B 5/103 221/2 |
| 2008/0157612 A1 * | 7/2008 | Suyama | ......... | B60G 7/006 310/83 |
| 2009/0241470 A1 | 10/2009 | Yuyama | | |
| 2010/0058711 A1 | 3/2010 | Blumenstock et al. | | |
| 2010/0281829 A1 | 11/2010 | Leu et al. | | |
| 2010/0307110 A1 * | 12/2010 | Wilhelm | ......... | B67B 3/12 53/329.2 |
| 2011/0113732 A1 * | 5/2011 | Adams | ......... | B65B 7/2842 53/452 |

* cited by examiner

SYSTEMS AND METHODS FOR CAPPING

CROSS-REFERENCE TO RELATED APPLICATIONS

This application is a continuation application of U.S. patent application Ser. No. 13/412,584 filed on Mar. 5, 2012; said application claims priority under 35 U.S.C. § 119(e) to U.S. Provisional Patent Application No. 61/449,523 filed on Mar. 4, 2011. The entire disclosures of U.S. application Ser. No. 13/412,584 and U.S. Provisional Patent Application No. 61/449,523 are hereby incorporated herein by reference.

FIELD

The present application relates generally to the technical field of automated filling centers. In a specific example, the present application may relate to a high volume fulfillment center, e.g., a high volume pharmacy and to systems and devices used in filling prescriptions and prescription orders at a high volume pharmacy.

BACKGROUND

A high-volume pharmacy, such as a mail order pharmacy, may process and fill a large number of prescriptions and prescription orders. Automated systems may be used by a high volume pharmacy to process and fulfill prescriptions.

A container that has been filled with a prescription drug via automation or manually may be capped or otherwise closed. Different styles of caps may be preferred.

DETAILED DESCRIPTION

Example systems and methods for capping are described. In the following description, for purposes of explanation, numerous specific details are set forth in order to provide a thorough understanding of example embodiments. It will be evident, however, to one of ordinary skill in the art that these embodiments may be practiced without these specific details.

Generally, different styles of caps may be required and/or preferred. For example, there may be a preference for a child-resistant cap whereas others prefer a cap that opens more easily. Example capping systems and methods disclosed herein accommodate a specific preference for a type of cap.

The cap device may select the type of cap based on the preference by directing a robot to pick a crown portion of the cap from a designated feeder. Using a capping implement, the crown portion is grasped and from the feeder and placed on a receiving portion of the cap.

Figure 1:
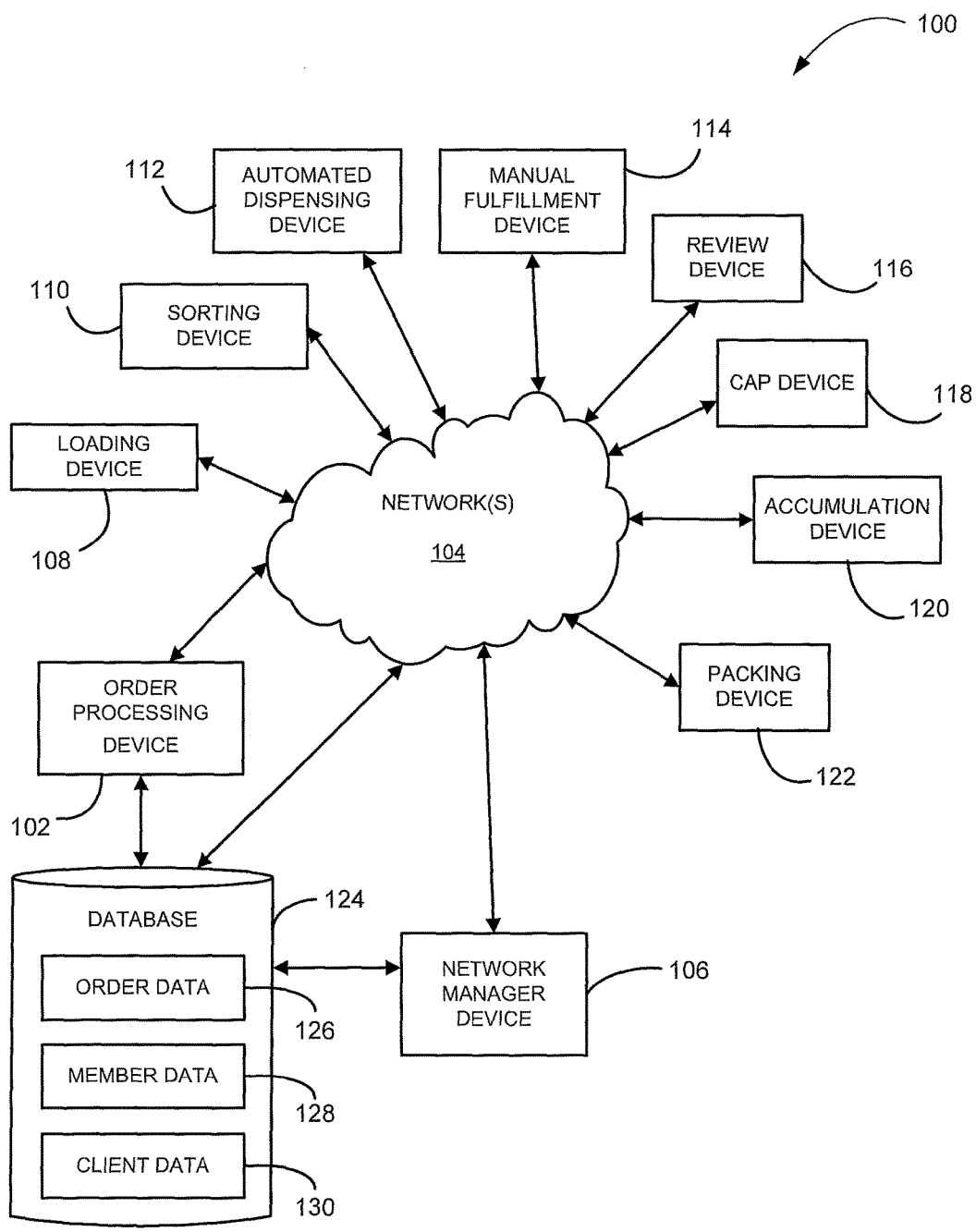
FIG. 1 is a block diagram of an example system according to an example embodiment.

FIG. 1 is a block diagram of an example system 100, according to an example embodiment. While the system 100 is generally described as being deployed in a high volume pharmacy, the automated filling system 100 may otherwise be deployed. The system 100 may include an order processing device 102 in communication with a network manager device 106 over a network 104.

The order processing device 102 may receive information about prescriptions being filled at a pharmacy in which the order processing device 102 is deployed. The order processing device 102 may track a prescription order as it is fulfilled. The order processing device 102 may make routing decisions and/or order consolidation decisions for a prescription order. The order processing device 102 may operate on its own or in combination with the network manager device 106.

Examples of the network 104 include Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. Other conventional and/or later developed wired and wireless networks may also be used.

The network manager device 106 is a device operated by an entity at least partially responsible for creation and/or management of the pharmacy benefit. While the network manager operating the network manager device 106 is typically a pharmacy benefit manager (PBM), other entities may operate the network manager device 106 either on behalf of themselves, the PBM, or another entity. The network manager device 106 may include a processor, memory to store data and instructions, and a communication device.

Some of the operations of the PBM that operates the network manager device 106 may include the following. A member (or a person on behalf of the member) attempts to obtain a prescription drug at a retail pharmacy location where the member can obtain drugs in a physical store from a pharmacist or pharmacist technician, or in some instances through mail order drug delivery from a mail order pharmacy location. The member may also obtain a prescription drug directly or indirectly through the use of a machine, such as a kiosk, vending unit, mobile electronic device, or a different type of computing device.

The member may have a co-pay for the prescription drug that reflects an amount of money that the member is responsible to pay the pharmacy for the prescription drug. The money paid by the member to the pharmacy may come from the personal funds of the member, a health savings account (HSA) of the member or the member's family, a health reimbursement arrangement (HRA) of the member or the member's family, a flexible spending accounts (FSA) of the member or the member's family, or the like. An employer of the member may directly or indirectly fund or reimburse the member or an account of the member for the co-pay.

The amount of the co-pay paid by the member may vary by the benefit plan of the client with the PBM. The member's co-pay may be based on a flat co-pay (e.g., $10), coinsurance (e.g., 10%), and/or a deductible (e.g., for first $500 of annual prescription drug spend) for certain prescription drugs, certain types of prescription drugs, and/or all prescription drugs.

In certain instances, the member may not pay the co-pay or may only pay for a portion of a co-pay for a prescription drug. For example, if the usual and customary cost for a generic version of a prescription drug is $4, and the member's flat co-pay is $20 for the prescription drug, the member may only pay $4 to receive the prescription drug. In another example involving a worker's compensation claim, no co-pay may be due by the member for the prescription drug.

In conjunction with receiving the co-pay (if any) from the member and dispensing the prescription drug to the member, the pharmacy submits a claim to the PBM for the prescription drug. The PBM may perform certain adjudication functions including verifying the eligibility of the member, reviewing the formulary to determine appropriate co-pay, coinsurance, and deductible for the prescription drug, and performing a drug utilization review (DUR) on the member. The PBM then adjudicates the claim associated with the prescription drug and provides a response to the pharmacy following performance of the aforementioned functions. As part of the adjudication, the client (or the PBM on behalf of the client) ultimately reimburses the pharmacy for filling the prescription drug when the prescription drug was successfully adjudicated. The aforementioned adjudication functions generally occur before the co-pay is received and the prescription drug dispensed. However, the operations may occur simultaneously, substantially simultaneously, or in a different order. In addition, more or less adjudication functions may be performed as part of the adjudication process. Adjudication may be performed through the use of a machine, such as a computer system.

The amount of reimbursement paid to the pharmacy by the client and/or member may be based at least in part on the type of pharmacy network in which the pharmacy is included. Other factors may be used to determine the reimbursement amount in addition to the type of pharmacy network. The above methodologies may be implemented by executing instructions in the network manager device 106.

The system 100 may include a loading device 108, a sorting device 110, an automated dispensing device 112, a manual fulfillment device 114, a review device 116, a cap device 118, an accumulation device 120 and/or a packing device 122.

The loading device 108 may load prescription containers by a robotic arm, pick and place mechanism, or the like. In one embodiment, the loading device 108 has robotic arms or pickers to grasp a container and move it to and from a pallet. The pallet may be located on a conveyor assembly.

The sorting device 110 may receive containers and may identify the containers that belong to a particular prescription drug order. The sorting device 110 may group the containers according to the prescription drug order in which they belong.

The automated dispensing device 112 includes one or more devices that dispense prescription drugs or pharmaceuticals into containers in accordance with one or more prescription orders. Various automated dispensing systems are available commercially such as e.g., the system sold under the trademark OPTIFILL by AmerisourceBergen Corporation.

The manual fulfillment device 114 provides for manually fulfilling prescriptions. In general, a manual fulfillment may include operations at least partially performed by a pharmacist or pharmacy technician. For example, a person may retrieve a supply of the prescribed drug, may make an observation, may count out a prescribed quantity of drugs and place them into a container, or the like. Some portions of the manual fulfillment process may be automated by use of a machine. For example, counting of capsules, tablets or pills may be at least partially automated (e.g., through use of a pill counter). In some embodiments, the automated fulfillment is integrated with the manual fulfillment operations. Certain automated fulfillment may be performed before manual fulfillment and vice versa. The automated fulfillment for a prescription may be paused to allow for the manual fulfillment to be completed. Once the devices receive an input that manual fulfillment is complete, then the automated fulfillment is released and fulfillment proceeds automatically.

The review device 116 may process containers to be reviewed by a pharmacist. Fulfilled prescriptions may be reviewed and/or verified by a pharmacist, as may be required by state or local law. In other embodiments, prescriptions are reviewed and/or verified for quality assurance. A pharmacist or other licensed person who may dispense certain drugs in compliance with local and/or other laws may operate the review device 116 and visually inspect a container that has been filled with a prescription drug. The pharmacist may review, verify, and/or evaluate drug quantity, drug strength, and/or drug interaction concerns, or otherwise perform pharmacist services.

The cap device 118 may be used to cap a container. In some embodiments, the cap device 118 may provide a type of cap in accordance with a patient preference (e.g., a preference regarding child resistance), a client preference, prescriber preference, etc. The cap device 118 may provide a crown portion, such as a ring or top, to cap the container. The ring or top operates cooperatively to provide child resistance. In other embodiments, no ring or top over a container may provide an easily-opened cap (e.g., for patients with fine motor disabilities). The cap is intended to close the opening into the container such that the contents, e.g., prescription drugs, are contained for a specified shelf life and limit entry of dirt, oxygen, moisture, etc. into the container. The cap can further operate to reduce drying or out-gassing of the contents in the container. The cap also may operate to keep the contents secure from undesired premature opening (e.g., during delivery using packaging delivery services or mail services). In some embodiments, the cap may be able to re-close and re-open the container.

The accumulation device 120 accumulates various prescription drugs in a prescription order. The accumulation device 120 may accumulate prescription containers from various area of the high volume fulfillment center. For example, the accumulation device 120 may accumulate prescription containers from the automated dispensing device 112, the manual fulfillment device 114, and the review device 116.

The packing device 122 packages a prescription order in preparation for shipping the order. The packaging device 122 may box or bag the fulfilled prescription order for delivery. The packaging device 122 may further place inserts into the box or bag. The packaging device 122 may label the box or bag with the address. The packaging device 122 may sort the box or bag for mailing in an efficient manner (e.g., sort by delivery address).

While the system 100 in FIG. 1 is shown to include single devices 102, 106-122 multiple devices may be used. The devices 102, 106-122 may be the same type of device or may be different device types. When multiple devices are present, the multiple devices may be of the same device type or may be a different device type. Moreover, system 100 shows a single network 104; however, multiple networks can be used. The multiple networks may communicate in series with each other to link the devices 102, 106-122 or in parallel to link the devices 102, 106-122. Multiple devices may share processing and/or memory resources. The devices 102-122 may be located in the same area or in different locations. For example, the devices 102, 106-122 may be located in a building or set of adjoining buildings. The devices 102, 106-122 may be interconnected (e.g. by conveyors), networked or otherwise in contact with one another.

In some embodiments, at least some of the functionality of the order processing device 102 may be included in the network manager device 106. In other embodiments, at least some of the functionality of the order processing device 102 may be included in the cap device 118 and vice versa.

The order processing device 102 may be in a client-server relationship with the network manager device 106, a peer-to-peer relationship with the network manager device 106, or in a different type of relationship with the network manager device 106.

The order processing device 102 and/or the network manager device 106 may be in communication directly (e.g., through local storage) and/or through the network 104 (e.g., in a cloud configuration or software as a service) with a database 124 (e.g., as may be retained in memory or otherwise). The database 124 may store order data 126, member data 128 and/or client data 130.

The order data 126 may include data used for completion of the prescription, such as prescription materials. Prescription materials are a type of order materials that include an electronic copy of information regarding the prescription drug for inclusion with the fulfilled prescription. The prescription materials may include electronic information regarding drug interaction warnings, recommended usage, possible side effects, expiration date, date of prescribing, etc.

The member data 128 includes information regarding the members associated with the benefit manager. Examples of the member data 128 include name, address, telephone number, e-mail address, prescription drug history, and the like. The member data 128 may include a client identifier that identifies the client associated with the member and/or a member identifier that identifies the member to the client. The member data 128 may include a member identifier that identifies the client associated with the patient and/or a patient identifier that identifies the patient to the client. The member data 128 may also include, by way of example, dispensation preferences such as type of label, type of cap, message preferences, language preferences, or the like. The member data 128 may be accessed by the devices 102, 106-122 to obtain the necessary information for fulfilling the prescription and shipping the prescription drugs.

The client data 130 includes information regarding the clients of the benefit manager. Examples of the client data 130 include company name, company address, contact name, contact telephone number, contact e-mail address, and the like.

Figure 2:
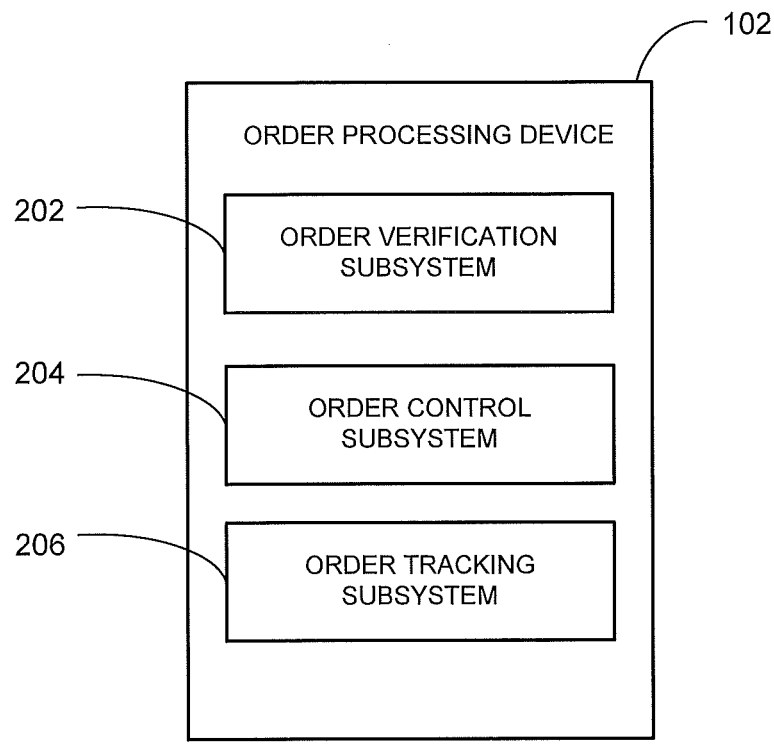
FIG. 2 is a block diagram of an example order processing device that may be deployed within the system of FIG. 1, according to an example embodiment.

FIG. 2 illustrates the order processing device 102, according to an example embodiment. The order processing device 102 may be used by one or more operators to generate prescription orders, make routing decisions, and/or make prescription order consolidation decisions. For example, the prescription order may be comprised of order components. The order processing device 102 may receive instructions to fulfill an order without operator intervention. An order component may include a prescription drug fulfilled in a container by the system 100. The order processing device 102 may direct an order component to the manual fulfillment device 114 or the review device 116 and direct other components to the automated dispensing device 112. The order processing device 102 may direct all order components to the accumulation device 120 for aggregation before shipping. The order processing device 102 may direct the order components directly to the packing device 122 if the prescription order does not require accumulation from various areas of the pharmacy for completion. The order processing device 102 may be deployed in the system 100, or may otherwise be used.

The order processing device 102 may include an order verification subsystem 202, an order control subsystem 204 and/or an order tracking subsystem 206.

The order verification subsystem 202 may communicate with the network manager device 106 to verify the eligibility of the member, review the formulary to determine appropriate co-pay, coinsurance, and deductible for the prescription drug, and/or perform a drug utilization review (DUR).

The order control subsystem 204 controls various movements of the containers and/or pallets along with various filling functions during progression through the system 100. For example, the order control subsystem 204 may identify the prescribed drug as needing to be fulfilled manually and may direct the container or order component to the manual fulfillment device 114 to achieve the manual fulfillment. The devices 108-122 may be interconnected by a system of conveyors or other container movement systems. Thus, the order control subsystem 204 may control various conveyors to deliver the pallet from the loading device 108 to the manual fulfillment device 114, for example.

The order tracking subsystem 206 tracks a prescription order as it progresses (or stops) toward fulfillment. The order tracking subsystem 206 may track, record and/or update order history, order status or the like. The order tracking subsystem 206 may store data locally (e.g., in a memory) or at the order data 124.

Figure 3:
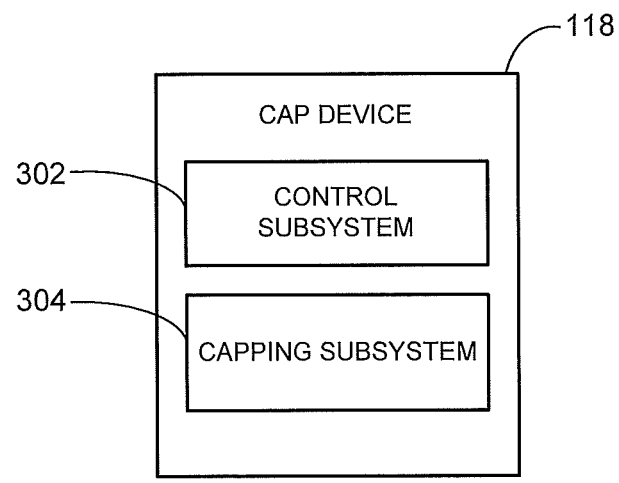
FIG. 3 is a block diagram of an example cap device that may be deployed within the system of FIG. 1, according to an example embodiment.

Referring now to FIG. 3, a cap device 118 is illustrated according to an example embodiment. The cap device 118 may be deployed in the system 100 of FIG. 1. The cap device 118 may include a control subsystem 302 and a capping subsystem 304. The control subsystem 302 enables the cap device 118 to control the capping subsystem 304. The capping subsystem 304 enables the cap device 118 with capping operations (e.g., securing a cap to a container).

Figure 4:
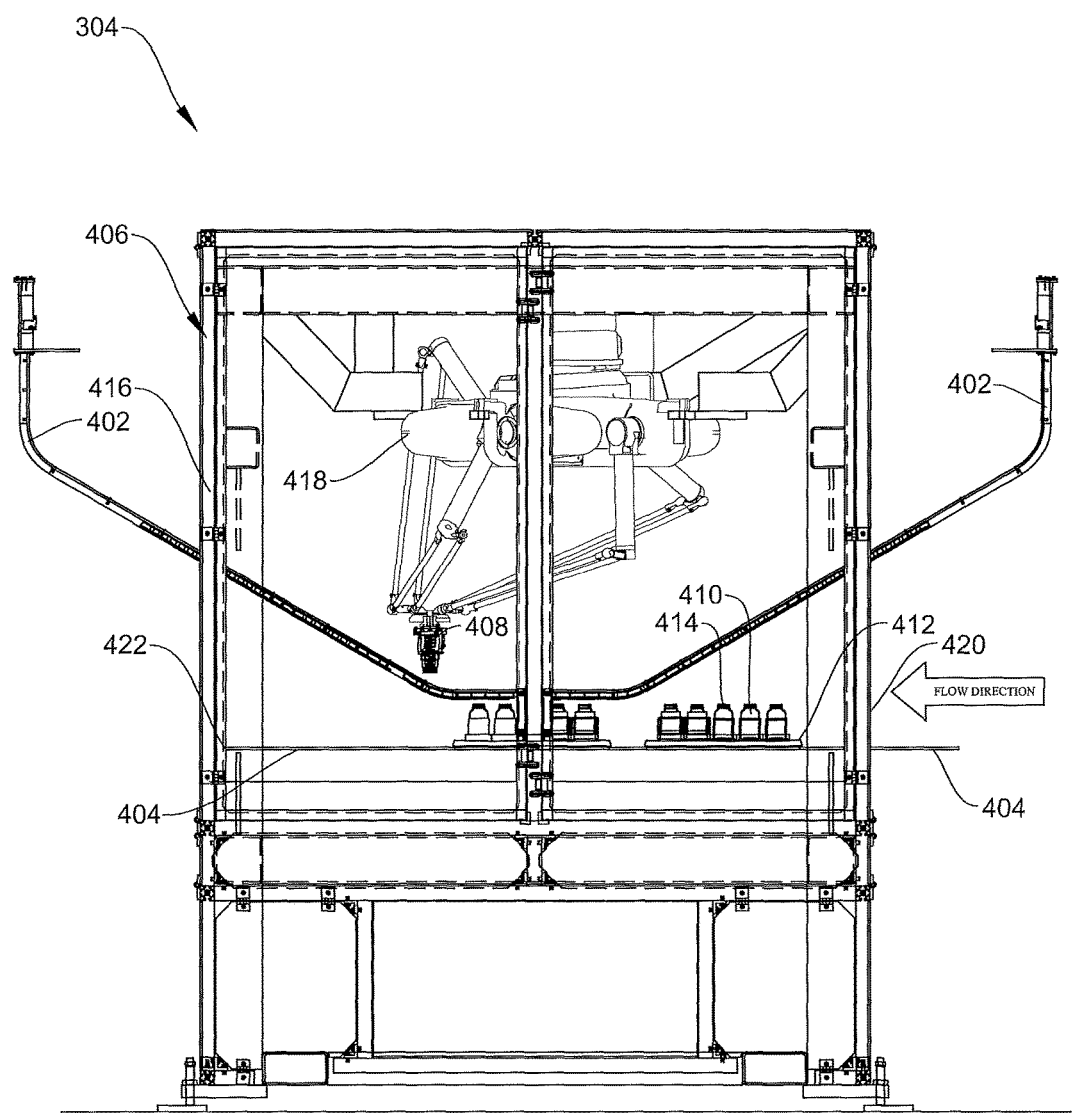
FIG. 4 is a side view of a cap subsystem that may be deployed within the cap device of FIG. 3, according to an example embodiment.

Referring now to FIG. 4, the capping subsystem 304 is illustrated according to an example embodiment. The capping subsystem 304 may include multiple crown feeders 402, a conveyor 404, a robot assembly 406 and a capping implement 408. The crown feeder 402 is disposed adjacent the robot assembly 406 and may be in the form of a chute, for example. The conveyor 404 delivers containers 410, disposed on a pallet 412, to the robot assembly 406. The conveyor 404 may start and stop as desired to allow for capping of the containers 410 with a cap 414. The robot assembly 406 includes a frame portion 416 and a robot 418. The frame portion 416 supports the robot 418 for operation. The frame portion has an entrance 420 and an exit 422 that allow the conveyor 404 therethrough. The conveyor 404 may deliver the pallet 412 through an entrance 420 of the robot assembly 406 and convey the pallet 412 through the robot assembly 406 to an exit 422. In the embodiment shown, the robot 418 is an Adept Quattro parallel robot such as that from Adept Technologies, Inc., Pleasanton, Calif. However, the robot 418 may be other types such as a SCARA robot from Adept Technologies, Inc., Pleasanton, Calif. or Epson Robots, Carson, Calif. The capping implement 408 may be disposed at an end portion of an arm of the robot 418. The capping implement 408 may be used to place at least a portion of the cap 414 onto the container 410.

Referring to FIGS. 5A-5D, the cap 414 is illustrated according to an example embodiment. The cap 414 may include a receiving portion 502 and a crown portion 504. The receiving portion 502 may be a separate cap member that threads onto a top of the container 410, for example. The receiving portion 502 may be adapted to mate with the crown portion 504.

Figure 5D:
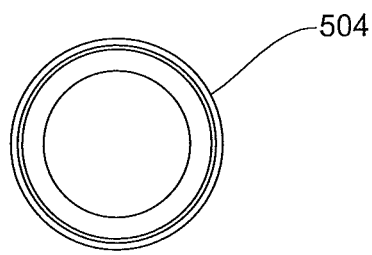
FIG. 5D is a bottom view of the crown portion of FIG. 5C, according to an example embodiment.
Figure 5C:
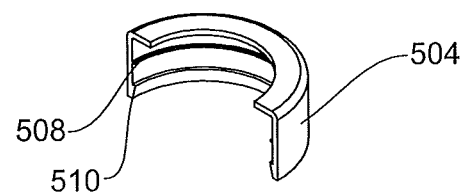
FIG. 5C is a partial cross sectional view of a crown portion of a cap, according to an example embodiment.
Figure 5B:
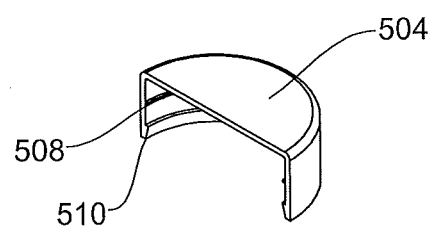
FIG. 5B is a partial cross sectional view of a crown portion of a cap, according to an example embodiment.
Figure 5A:
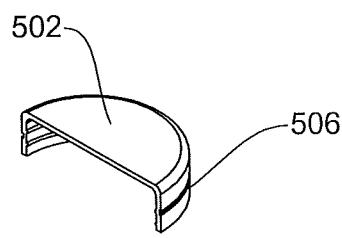
FIG. 5A is a partial cross sectional view of a receiving portion of a cap, according to an example embodiment.
Figure 6A:
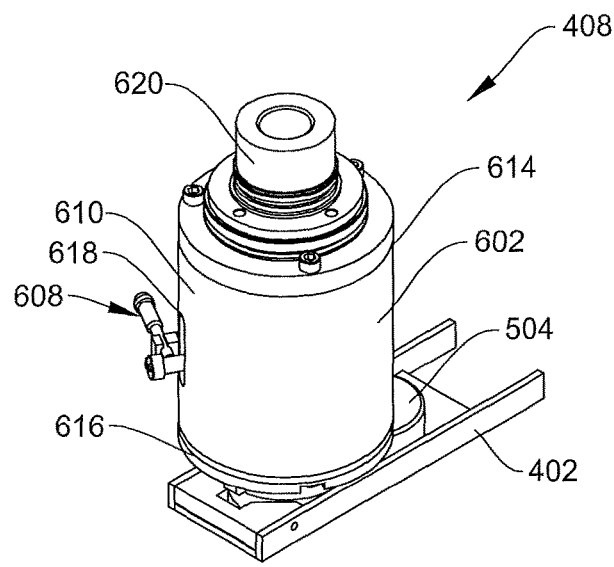
FIG. 6A is a perspective view of a capping implement that may be deployed within the cap subsystem of FIG. 4, according to an example embodiment.
Figure 6B:
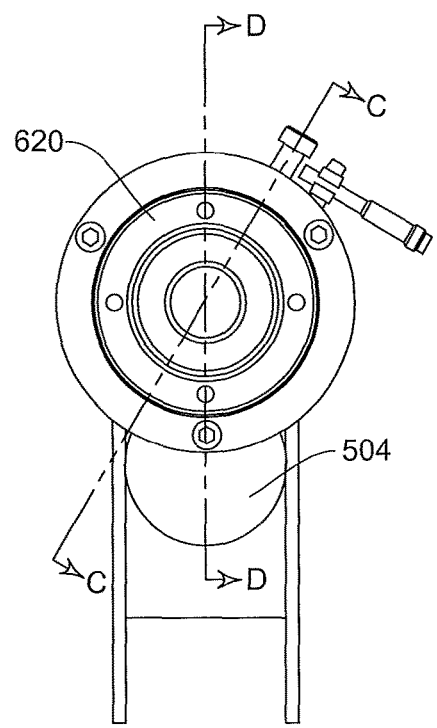
FIG. 6B is a top view of the capping implement of FIG. 6A, according to an example embodiment.
Figure 6C:
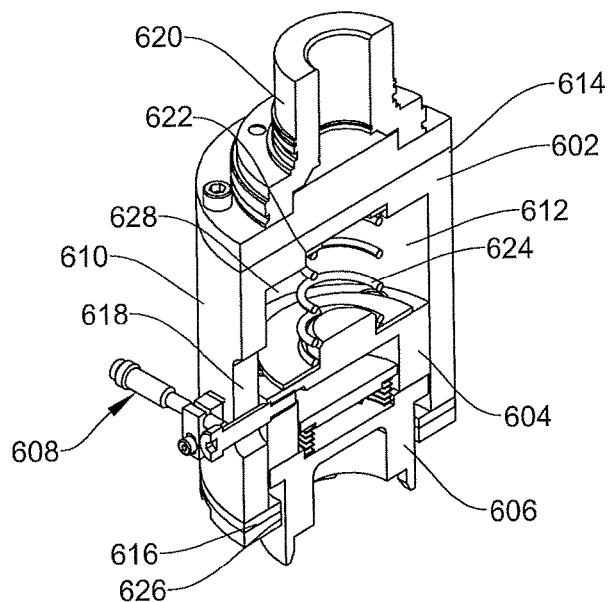
FIG. 6C is a partial cross sectional view of the capping implement taken along line C-C in FIG. 6B, according to an example embodiment.
Figure 6D:
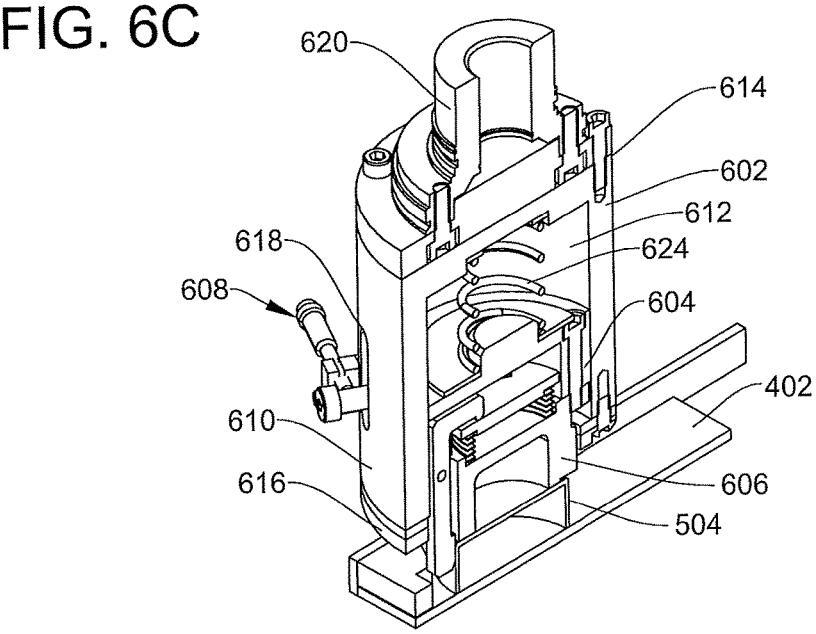
FIG. 6D is a partial cross sectional view of the capping implement taken along line D-D in FIG. 6B, according to an example embodiment.

Referring to FIG. 5A, the receiving portion 502 may include an annular groove 506 in an exterior, e.g., outer diameter, of the receiving portion 502. In some embodiments, the receiving portion 502 includes the annular groove 506 integral with the container 410 such that the annular groove 506 and the container 410 form a one-piece, unitary member with an opening of the container 410 being closed by the crown portion 504.

Referring to FIG. 5B, the crown portion 504 may include an annular protrusion 508 along an inner diameter of the crown portion 504 and/or a securing lip 510. The securing lip 510 may flex as the crown portion 504 slides over the receiving portion 502. Once secure, the crown portion 504 may no longer be removed because of engagement of the securing lip 510 with the receiving portion 502. Other embodiments may include various male and female mating elements instead of or in addition to the annular groove 506 and the annular protrusion 508. In still other embodiments, the outer diameter of the receiving portion 502 will be sized and configured for a friction fit within the inner diameter of the crown portion 504 in addition to or instead of the annular groove 506 and the annular protrusion 508.

FIGS. 5C and 5D illustrate an embodiment of the crown portion 504 in which the crown portion 504 is ring-shaped, a partial cross-sectional perspective view and a bottom view, respectively.

Referring to FIGS. 6A-6D, the capping implement 408 is illustrated according to an example embodiment. The capping implement 408 may include a first housing 602, a second housing 604, a third housing 606, and a sensor assembly 608. The first housing 602 may house the second and third housings 604, 606. The second housing may be connected to the sensor assembly 608. The third housing 606 may engage the crown portion 504.

The first housing 602 may be cylindrically shaped and include an exterior surface 610 having an outer diameter, an interior surface 612 having an inner diameter, a top portion 614, and a bottom portion 616. The exterior surface 610 may include a slot 618 running vertically and extending from the outer diameter to the inner diameter. The top portion 614 may have a robot adapter 620 attached on an exterior to connect with an arm of the robot 418. The top portion 614 may include a spring bore 622 at an interior with a diameter and depth to accommodate a top portion of a first spring 624 or biasing member. The bottom portion 616 may include an inward annular flange 626.

The interior surface 612 may form a first cavity 628 within the first housing 602. The second housing 604 may be slidably disposed within the first housing 602 at the first cavity 628. The second housing 604 may be cylindrically shaped with an outer diameter substantially the same as the inner diameter of the interior surface 612 of the first housing 602.

Figure 7A:
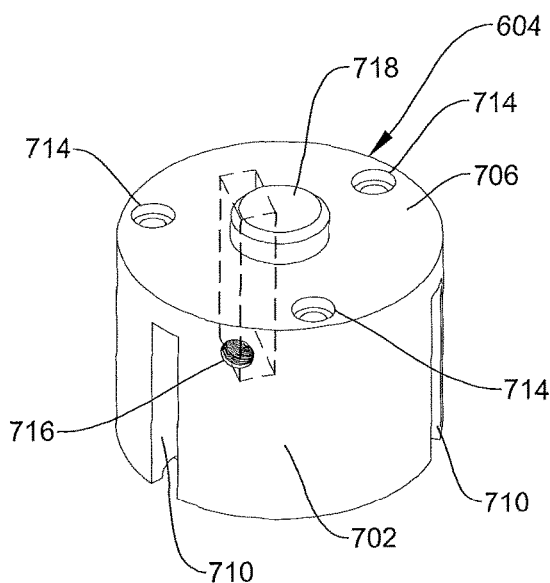
FIG. 7A is a perspective view of a second housing that may be deployed in the capping implement of FIGS. 6A-6D, according to an example embodiment.
Figure 7B:
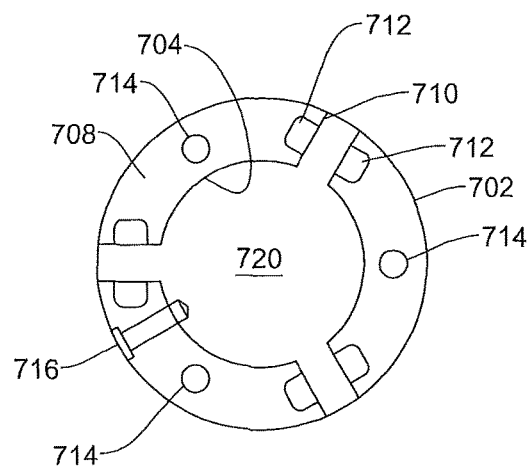
FIG. 7B is a bottom view of the second housing of FIG. 7A, according to an example embodiment.

Referring to FIGS. 7A-7B, the second housing 604 is illustrated according to an example embodiment. The second housing 604 may include an exterior surface 702 having an outer diameter, an interior surface 704 having an inner diameter, a top portion 706, and a bottom portion 708. The exterior surface 702 has multiple jaw slots 710 running vertically from the top portion 706 to the bottom portion 708 and extending from the exterior surface 702 to the interior surface 704. Within the jaw slot 710, multiple dowel grooves 712 are formed. Between the jaw slots 710, multiple fastener bores 714 are formed. A pin bore 716 is formed through the exterior surface 702 between the slot 710 and the fastener bore 714. The top portion 706 may include a spring-receiving protrusion 718 extending upwardly at a length for securing a bottom portion of the first spring 624. The spring protrusion 718 may be cylindrical with a diameter sized to fit within the first spring 624.

The interior surface 704 may form a second cavity 720 within the second housing 604. The third housing 606 may be slidably disposed within the first housing 602 at the first cavity 628. The third housing 606 may be cylindrically shaped with an outer diameter substantially the same as the inner diameter of the interior surface 612. The third housing may be attached to the second housing 604 so as to close a bottom portion of the second cavity 720.

Figure 8A:
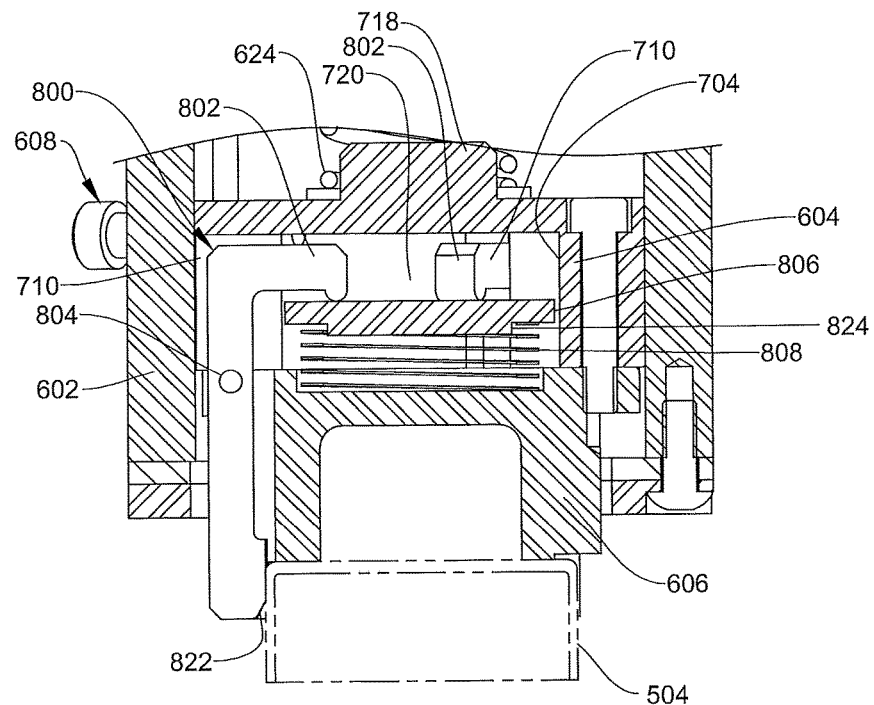
FIG. 8A is a partial cross sectional view of a jaw assembly that may be deployed in the capping implement of FIGS. 6A-6D, according to an example embodiment.
Figure 8B:
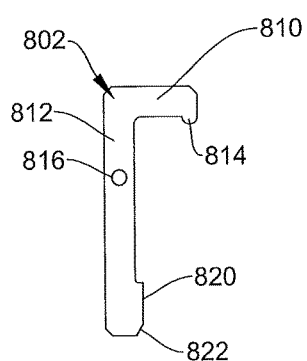
FIG. 8B is a side view of a jaw member that may be deployed in the jaw assembly of FIG. 8A, according to an example embodiment.
Figure 8C:
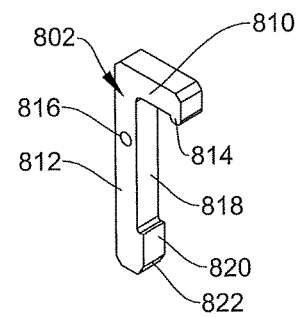
FIG. 8C is a perspective view of the jaw member of FIG. 8B, according to an example embodiment.

Referring to FIGS. 8A-8C, the second housing 604 may include a jaw assembly 800. The jaw assembly 800 may include multiple jaw members 802, multiple dowel pins 804, a push member 806 and a second spring 808 (or other second biasing member). The jaw member 802 may be sized to fit within the jaw slot 710. The jaw member 802 may include a first engaging arm 810 and a second engaging arm 812. The first engaging arm 810 is disposed substantially perpendicular to the second engaging arm 812. The first engaging arm 810 may include an engagement lip 814 that extends downwardly at an end portion opposite the junction of the first and second engaging arms 810, 812. The engagement lip 814 is adapted to engage the push member 806. The second engaging arm 812 may include a dowel aperture 816, a platform groove 818, an engaging face 820, and an incline lip 822. The dowel aperture 816 is disposed in the second engaging arm 812 with an inner diameter that slidably fits over an outer diameter of the dowel pin 804. The platform groove 818 may be located on a side facing the first engaging arm 812. The platform groove 818 is adapted to accommodate at least a portion of the third housing 606. The incline lip 822 is disposed at an end portion of the second engaging arm 812 that is opposite the junction of the first and second engaging arms 810, 812. The incline lip 822 is adapted to accommodate at least a portion of the third housing 606 and/or the crown portion 504. The crown portion 504 may be engaged with two or more jaw members 802, for example. The engaging face 820 is adapted to engage the crown portion 504.

The push member 806 may be a cylindrical, disc-like member disposed within the second cavity 720. The push member 806 may include a downwardly extending spring-receiving protrusion 824 for securing the second spring 808. The spring protrusion 824 may be sized with an outer diameter for fitting inside the second spring 808. The second spring 808 may be a REDUX wave spring from Lee Spring Company, Brooklyn, N.Y., for example. The second spring 808 is disposed in the second cavity 720 to engage the push member 806 at one end and the third housing 606 at the other end.

Figure 9A:
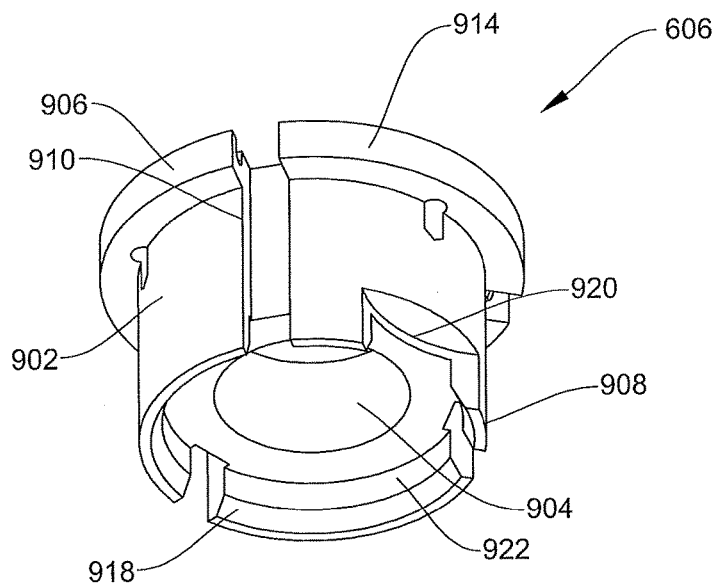
FIG. 9A is a bottom perspective view of a third housing that may be deployed in the capping implement of FIGS. 6A-6D, according to an example embodiment.
Figure 9B:
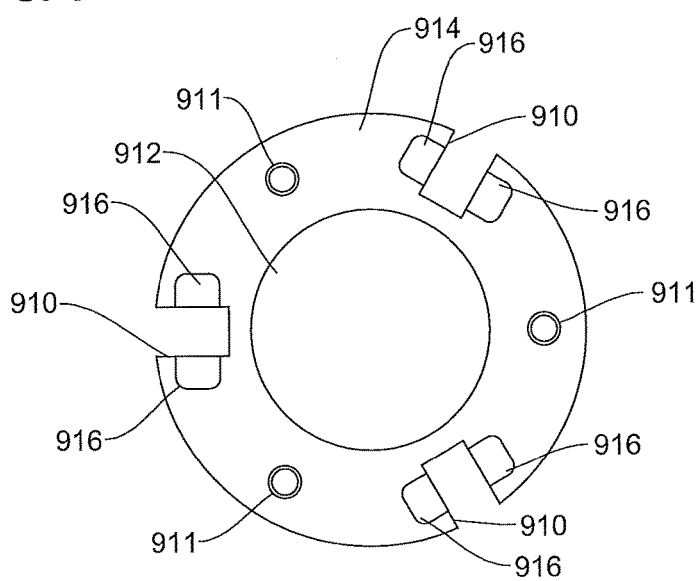
FIG. 9B is a top view of the third housing of FIG. 9A, according to an example embodiment.

Referring to FIGS. 9A and 9B, the third housing 606 is illustrated according to an example embodiment. The third housing 606 may include an exterior surface 902 having an outer diameter, an interior surface 904 having an inner diameter, a top portion 906, and a bottom portion 908. The exterior surface 902 is slidably disposed at the interior surface 612 of the first housing 602. The third housing 606 may be cylindrically shaped with the top portion 906 having an outer diameter substantially the same as the inner diameter of the interior surface 612 and the bottom portion 908 having an outer diameter substantially the same as an inner diameter of the inward annular flange 626. The exterior surface 902 may include multiple jaw grooves 910 adapted to accommodate the jaw members 802.

The bottom portion 908 is adapted to accommodate the diameter of the crown portion 504. The top portion 906 is attached to the bottom portion 708 of the second housing 604 by fasteners running through the fastener bores 714 and threaded into fastener threads 911. The top portion 906 may include a spring bore 912 to accommodate the second spring 808. The spring bore 912 may have a diameter to accommodate the diameter of the second spring 808. The top portion 906 may include an outwardly extending annular flange 914. Within the jaw grooves 910, the annular flange 914 includes multiple dowel grooves 916. The top portion 906, as mated with the bottom portion 708, traps the dowel pin 804, extending through the second engaging arm 812, within the dowel groove 712 and the dowel groove 916, thereby providing a pivoting location for the jaw member 802.

The bottom portion 908 may include an incline lip 918, a crown accommodation section 920 and a bottom interior surface 922. The incline lip 918 may provide clearance for the crown portion 504 as it enters or exits the bottom portion 908. The crown accommodation section 920 is an arcuate notch on an exterior of the bottom portion 908. The arcuate notch has a diameter substantially equal to the diameter of the crown portion 504. Thus, the crown accommodation section 920 provides an area for the crown portion 504 to rest against the third housing 606. The bottom interior surface 922 is substantially the same diameter as the exterior of the crown portion 504. Thus, the bottom interior surface 922 and the jaw members 802 may grasp the crown portion 504.

Figure 10:
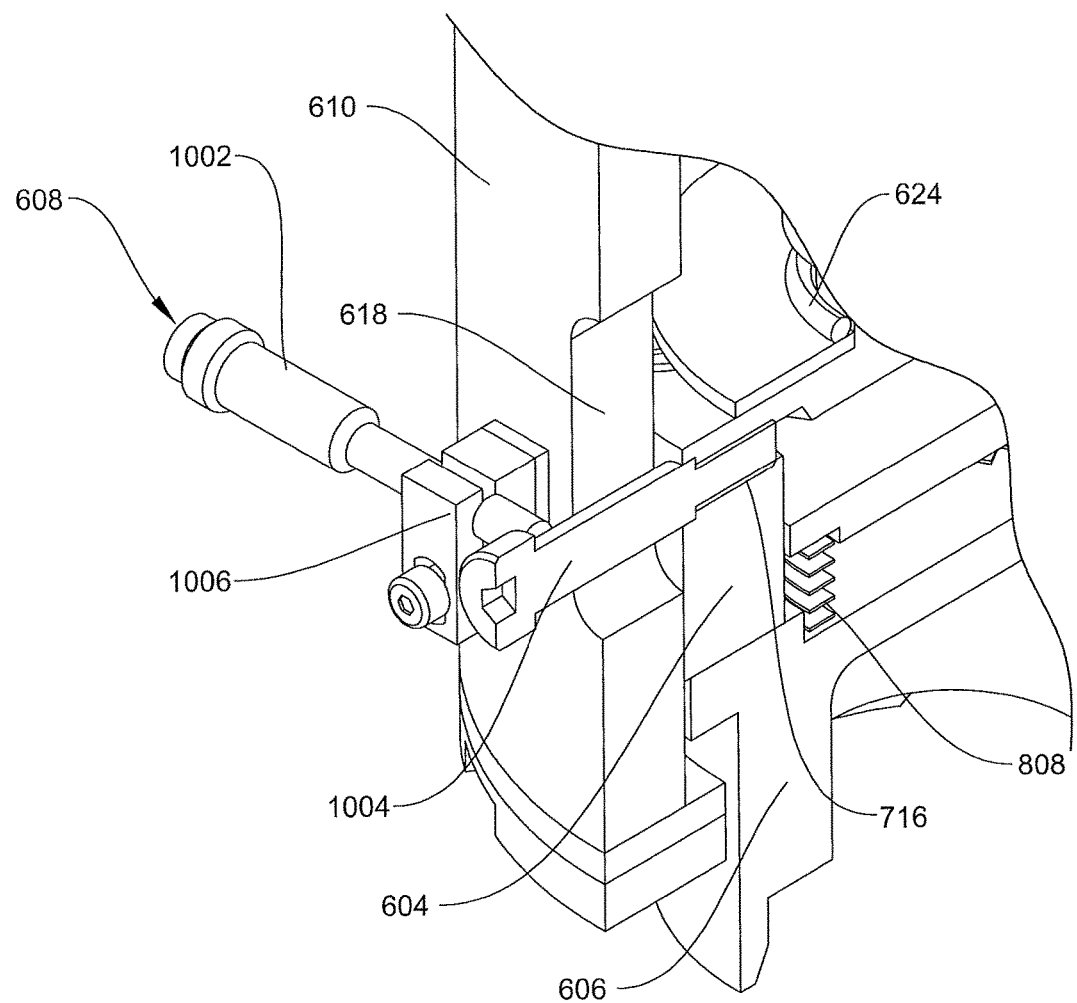
FIG. 10 is a magnified view of a sensor assembly in FIG. 6C, according to an example embodiment.

Referring to FIG. 10, the sensor assembly 608 is illustrated according to an example embodiment. The sensor assembly 608 may include a sensor 1002, a pin or extension 1004 (or other elongate member) and bracket 1006. The sensor 1002 may be a photosensor, for example, that is communicatively connected to the control subsystem 302. The pin 1004 is securely fastened to the pin bore 716 of the second housing 604. The pin 1004 extends through the slot 618 and past the sensor 1002. Thus, the pin 1004 travels vertically within the slot 618 with vertical movement of the second housing 604. The bracket 1006 is attached to the exterior surface 610 of the first housing 602 to secure the sensor 1002 proximal the exterior surface 610 and the slot 618.

Figure 11:
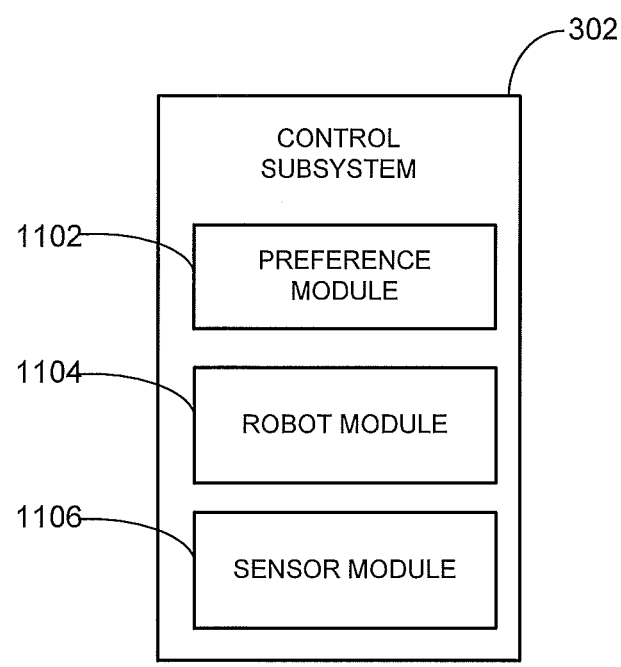
FIG. 11 is a block diagram of an example control subsystem that may be deployed in the cap device of FIG. 3, according to an example embodiment.

FIG. 11 illustrates an example control subsystem 302 that may be deployed in the order processing device 102, the cap device 118, or otherwise deployed in another system. One or more modules are communicatively coupled and included in the control subsystem 302 to enable control of the capping. The modules of the control subsystem 302 that may be included are a preference module 1102, a robot module 1104, and/or a sensor module 1106. Other modules may also be included.

In some embodiments, the modules of the control subsystem 302 may be distributed so that some of the modules are deployed in the order processing device 102 and some modules are deployed in the cap device 118. In one embodiment, the modules are deployed in memory and executed by a processor coupled to the memory. The functionality contained within the modules 1102-1106 may be combined into a lesser number of modules, further divided among a greater number of modules, or redistributed among existing modules. Other configurations including the functionality of the modules 1102-1106 may be used.

The preference module 1102 accesses member or client dispensation preferences from the order processing device 102 or the database 124, for example. Based on the dispensation preferences that dictate a preference of the cap 414 on the container 410, the preference module 1102 may determine which feeder holds the desired crown portion 504 to form the preferred cap 414. The preference module 1102 may send the information to the robot module 1104.

The robot module 1104 may command the robot 418 to maneuver the capping implement 408 to the desired feeder. Based on the preferences determined by the preference module 1102, the robot module 1104 may instruct selection of a corresponding crown portion 504 by the robot 418 with the robot implement 408. Once the crown portion 504 is obtained, the robot module 1104 may command the robot 418 to maneuver the capping implement 408 to the receiving portion 502 on the container 410. The robot module 1104 may command the robot 418 to substantially align a longitudinal axis of the capping implement 408 with a longitudinal axis of the container 410 and/or the receiving portion 502. The robot module 1105 may operate the robot 418 to skip capping of some containers 410 that do not require a crown portion 504 based on the dispensation preference.

The sensor module 1106 may monitor the sensor 1002. The sensor module 1106 may coordinate with the robot module 1104 so as to determine whether the capping implement 408 is engaged with the crown portion 504, when the capping implement 408 should disengage with the crown portion 504, when the crown portion 504 is improperly lodged within the third housing 606 or when the crown portion 504 is expected but not present at the capping implement 408. The sensor module 1106 may determine the location of the pin 1004 or may track movement of the pin 1004 with the sensor 1002. In some embodiments, the sensor module 1106 may track the number of occurrences in which the sensor 1002 was unblocked or blocked by the pin 1004 as it moves within the slot 618.

Figure 12:
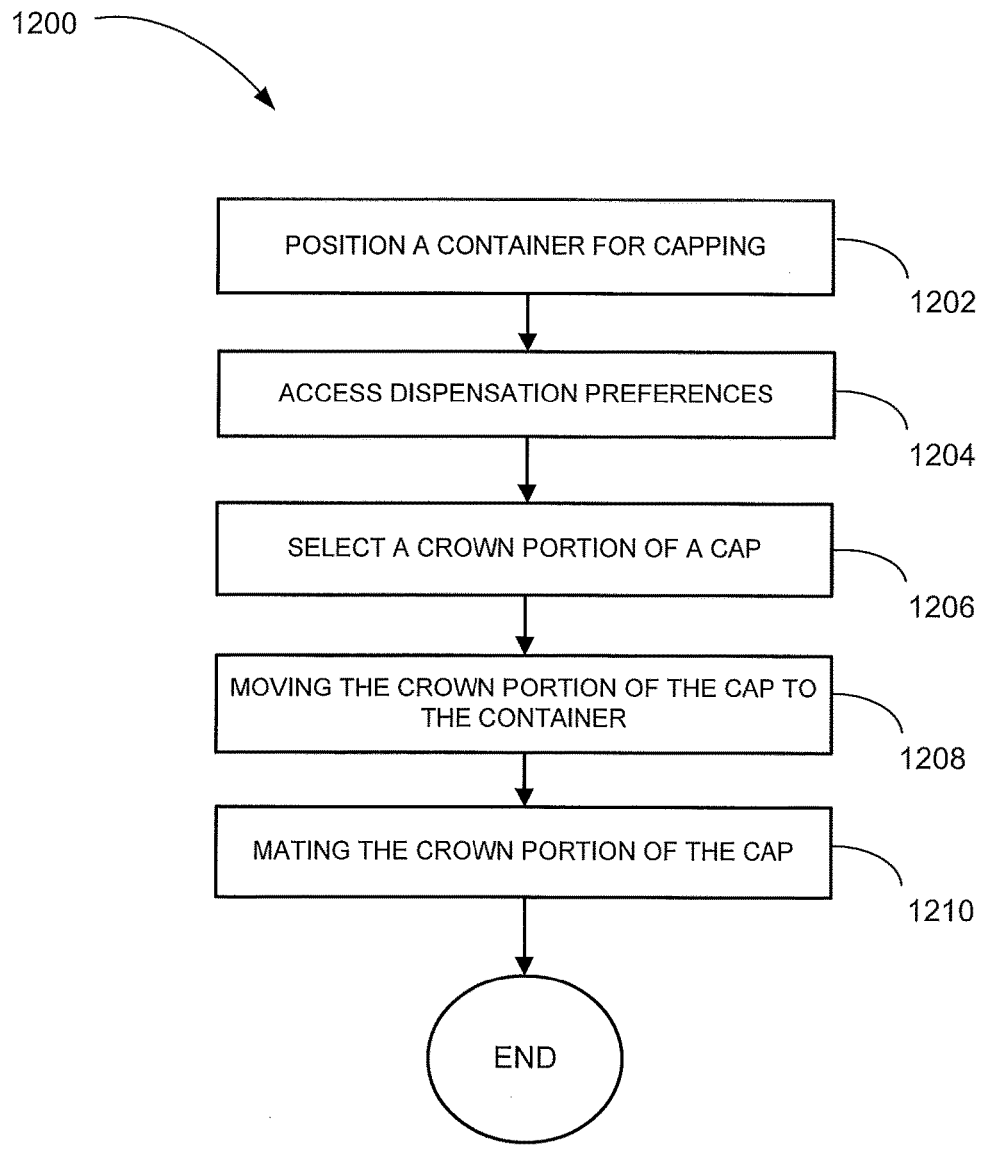
FIG. 12 is an example process flow illustrating a method of capping, according to an example embodiment.

FIG. 12 illustrates a method 1200 for capping, according to an example embodiment. The method 1200 may be performed by the cap device 118, partially by the order processing device 102 and partially by the cap device 118, or may be otherwise performed.

At block 1202, the container 410 with a receiving portion 502 is positioned for capping. The container 410 may be located on the pallet 412 within the robot assembly 406 for engagement with the capping implement 408. The pallet 412 with the container 410 may be on the conveyor 404, may enter the robot assembly 406 through the entrance 420 and may exit through the exit 422.

At block 1204, dispensation preferences for the container 410 are accessed. Dispensation preferences may include a preference of the type of the cap 414. The caps 414 may be of various colors besides white. Furthermore, a member or a client may have a preference on the color of the cap 414. Caps 414 of different sizes, shapes and/or functions may also be preferred by the member or the client. Ring crown portions 504 (FIG. 5C) may be provided on containers 414 and/or crown portions 504 that prevent child-proof tampering may be provided. Any combination of color, size, shape, and function may be provided as a dispensation preference.

At block 1206, a crown portion 504 of the cap 414 is selected based on the dispensation preferences. The feeders 402 (FIG. 4) may each hold a different type of crown portion 504 for the robot 418 to select from. Based on determined dispensation preferences, a corresponding crown portion 504 is selected by the robot 418 with the robot implement 408. The robot 418 may align the robot implement 408 over the crown portion 504 in the crown feeder 402.

The robot implement 408 may grasp the crown portion 504 as the robot 418 applies downward pressure onto the first housing 602 of the robot implement 408. As the crown portion 504 enters the third housing 606, the incline lip 822 and/or the incline portion 918 slide over the crown portion 504. The engaging face 820 of the jaw member 802 grasps the crown portion 504 to hold the crown portion 504 at the third housing 606. The jaw members 802 are biased to pivot so as to grasp the crown portion 504. The second spring 808 and the pressure member 806 apply spring force onto the first engaging arm 810. As the crown portion 504 passes by the incline lip 822 and contacts the engaging face 820, the jaw members 802 pivot outwardly. The second engaging arm 812 is pushed outwardly and pivots about the dowel pin 804 such that the first engaging arm 810 applies downward force against the push member 806, compressing the second spring 808. As the second spring 808 is compressed, increasing inward force is applied to the second engaging arm 812 and engaging face 820, thereby securing the crown portion 504 inside the bottom portion 908. When downward pressure is applied by the robot implement 408 onto the crown portion 504, the second and third housings 604, 606 move upward, compressing the first spring 624. Upward movement of the second housing 604 moves the pin 1004. When downward force onto the crown portion 504 is removed, the first spring 624 will decompress, and pin 1004 will return to its original position.

At block 1208, the crown portion 504 of the cap 414 is moved to the container 410. The robot 418 may move the robot implement 408, holding the crown portion 504, from the crown feeder 402 to the container 414. The robot 418 may align the robot implement 408 over the container 414.

At block 1210, the crown portion 504 of the cap 414 is mated with the receiving portion 502. The robot 418 may apply a downward force onto the robot implement 408 that holds the crown portion 504. The downward force may be approximately 12 lbs, for example. The downward force causes the annular protrusion 508 and/or the securing lip 510 to slide over the receiving portion 502 until mated. Mating may occur by the annular protrusion 508 fitting into the annular groove 506 and/or the securing lip 510 snapping underneath the receiving portion. The weight of the container 410 or mechanically securing the container 410 causes the crown portion 504 to slip out of the jaw members 802 as the robot 418 upwardly pulls the capping implement 408 away from the receiving portion 502.

When downward pressure is applied by the robot implement 408 onto the crown portion 504, the second and third housings 604, 606 move upward. Upward movement of the second housing 604 moves the pin 1004. Movement of the second and third housings 604, 606 can be tracked or verified with the sensor 1002 by sensing movement of the pin 1004 in the slot 618.

Without a crown portion 504 grasped by the jaw members 802, the pin 1004 rests under the sensor 1002 at a bottom of the slot 618. That is, the pin 1004 does not block the sensor 1002. The pin 1004 is approximately located at the bottom of the slot 618 when a crown portion 504 is grasped by the jaw members 802. When the robot 418 applies downward force on the first housing 602 to mate the crown portion 504 with the receiving portion 502, the pin 1004 may be forced upwardly so as to temporarily block the sensor 1002. The location of the pin 1004 may be determined or movement of the pin 1004 may be tracked with the sensor 1002. In some embodiments, the number of occurrences in which the sensor 1002 was unblocked or blocked by the pin 1004 as it moves within the slot 618 may be tracked.

Figure 13:
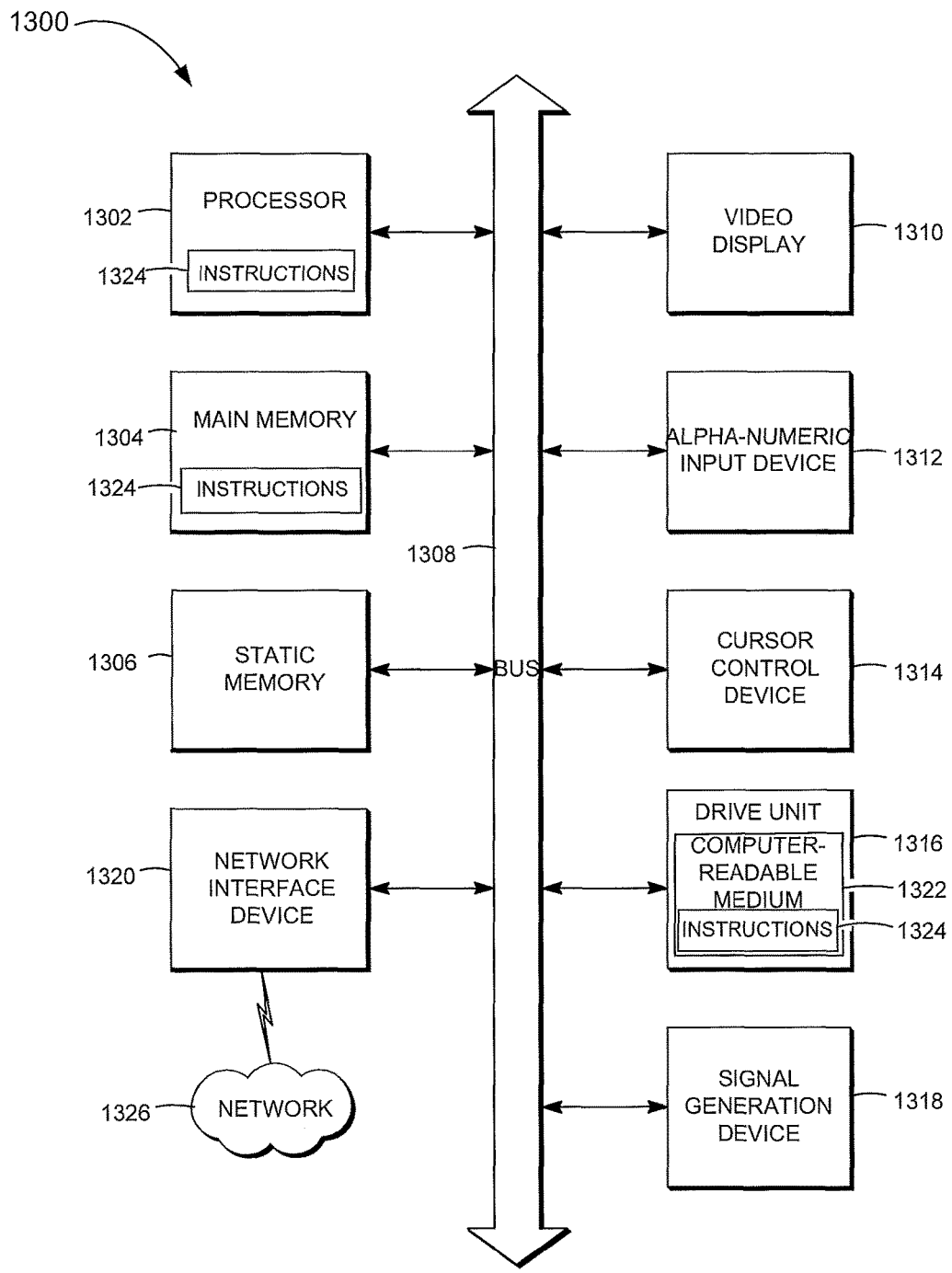
FIG. 13 is a block diagram of a machine in the example form of a computer system within which a set of instructions for causing the machine to perform any one or more of the methodologies discussed herein may be executed or stored.

FIG. 13 shows a block diagram of a machine in the example form of a computer system 1300 within which a set of instructions may be executed causing the machine to perform any one or more of the methods, processes, operations, or methodologies discussed herein. The order processing device 102, the network manager device 106, and the cap device 118 may include the functionality of the one or more computer systems 1300.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a gaming device, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU) a graphics processing unit (GPU) or both), a main memory 1304 and a static memory 1306, which communicate with each other via a bus 1308. The computer system 1300 further includes a video display unit 1310 (e.g., a liquid crystal display (LCD) or a cathode ray tube (CRT)). The computer system 1300 also includes an alphanumeric input device 1312 (e.g., a keyboard), a cursor control device 1314 (e.g., a mouse), a drive unit 1316, a signal generation device 1318 (e.g., a speaker) and a network interface device 1320.

The drive unit 1316 includes a computer-readable medium 1322 on which is stored one or more sets of instructions (e.g., software 1324) embodying any one or more of the methodologies or functions described herein. The software 1324 may also reside, completely or at least partially, within the main memory 1304 and/or within the processor 1302 during execution thereof by the computer system 1300, the main memory 1304 and the processor 1302 also constituting computer-readable media.

The software 1324 may further be transmitted or received over a network 1326 via the network interface device 1320.

While the computer-readable medium 1322 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, solid-state memories, and optical media, and magnetic media. In some embodiments, the computer-readable medium is a non-transitory computer-readable medium.

The term "based on" or using, as used herein, reflects an open-ended term that can reflect others elements beyond those explicitly recited.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

The inventive subject matter may be represented in a variety of different embodiments of which there are many possible permutations.

In an example embodiment, a system is provided with an order processing device, a cap device, a plurality of feeders, and a capping implement. The order processing device is for processing orders with containers. The cap device is adapted to cap the container and is communicatively connected to the order processing device. The cap device is adapted to receive dispensation preferences from the order processing device. The cap device includes a plurality of feeders and a capping implement. Each feeder has a unique type of crown portion of a cap for capping. The capping implement is adapted to grasp the crown portion from the feeder. The cap device is adapted to select a feeder from which to grasp the crown portion based on the dispensation preferences.

In an example embodiment, a container with a receiving portion for capping is positioned. Dispensation preferences for the container are accessed. A crown portion of a cap is selected based on the dispensation preferences. The crown portion of the cap is moved to the container. The crown portion of the cap is mated with the receiving portion.

In an example embodiment, a capping implement is provided with a first housing, a second housing and a third housing, a first spring, a second spring, a sensor assembly and a plurality of jaw members. The second and third housings are disposed in the first housing. The first spring is disposed between the first and second housing. The second spring is disposed between the second and third housings. The sensor assembly is disposed on the first and second housings. The sensor assembly is adapted for monitoring movement of the second housing and the third housing. The jaw members are adapted to grasp a crown portion of a cap. The jaw members are pivotally disposed in a cavity of the first housing.

The present disclosure makes reference to the term "robot" and words of similar import. A robot can be a machine capable of carrying out a complex series of actions automatically. These complex series of actions may include picking up and placing a container, a cap or other structure. The robot may be dedicated to a single series of movements or may be able to execute multiple series of movements. A robot may include a processor that received instructions and then executes instructions to control its movement. In another example, a robot may resemble a human being and replicate certain human movements and functions, e.g., a robot may move location, have an articulated arm, have grasping structures that replicate like fingers and do not damage containers, caps or the like.

Thus, methods and systems for capping have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks are shown in the flowcharts, the methods may be performed continuously.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

The invention claimed is:

1. A system comprising:
an order processing device to process an order including a plurality of containers located on a pallet; and
a cap device adapted to cap a container of the plurality of containers and communicatively connected to the order processing device, the cap device being adapted to receive dispensation preferences from the order processing device, and the cap device including:
a plurality of feeders, each feeder including a plurality of crown portions for capping, the plurality of the crown portions in each feeder having a crown portion type of a plurality of the crown portion types, wherein the cap device is adapted to select a feeder from among the plurality of feeders to grasp the crown portion based on the dispensation preferences, and wherein the dispensation preferences include at least one of no crown portion required and crown portion required; and
a capping implement adapted to grasp a crown portion of the plurality of the crown portions from the feeder of the plurality of feeders, wherein the capping implement includes a first housing, a second housing, and a third housing, and wherein both the second housing and third housing are adapted to engage the crown portion when a crown portion is required.

2. The system of claim 1, wherein each container of the plurality of the containers includes a receiving portion, the receiving portion including an annular groove to secure the crown portion to the container.

3. The system of claim 2, wherein the container is closed by the crown portion.

4. The system of claim 3, wherein the capping implement is further adapted to place the crown portion on the receiving portion.

5. The system of claim 3, wherein one of the dispensation preferences is for a child-resistant cap, and the crown portion type in at least one of the plurality of feeders is configured to provide child resistance.

6. The system of claim 3, wherein the crown portion includes an annular protrusion along an inner diameter of the crown portion.

7. The system of claim 3, wherein the capping implement is further adapted to place the crown portion on the receiving portion, wherein the crown portion includes a securing lip formed from an annular protrusion along an inner diameter of the crown portion, and wherein the securing lip flexes during at least some of a placement process of placing the crown portion on the receiving portion by the capping implement.

8. The system of claim 1, further comprising:
a conveyor to convey a pallet with the plurality of containers through the cap device.

9. The system of claim 8, further comprising:
a loading device to load the plurality of containers onto the pallet on the conveyor.

10. The system of claim 1, wherein the second and third housings are disposed in the first housing.

11. The system of claim 10, wherein the capping implement includes a first spring disposed between the first housing and the second housing and a second spring disposed between the second and third housings.

12. The system of claim 10, wherein the capping implement includes a plurality of jaw members pivotally disposed in a cavity of the first housing, and the jaw members are adapted to grasp the crown portion of the plurality of the crown portions.

13. The system of claim 1, wherein the capping implement comprises
a first spring disposed between the first housing and the second housing;
a second spring disposed between the second and third housings, wherein the second and third housings are disposed in the first housing;
a sensor assembly disposed on the first and second housings, the sensor assembly being adapted for monitoring movement of the second housing and the third housing; and
a plurality of jaw members adapted to grasp the plurality of the crown portions, the plurality of jaw members being pivotally disposed in a cavity of the first housing.

14. The system of claim 13, wherein the sensor assembly includes a pin connected to the second housing and extending through a slot in the first housing.

15. The system of claim 13, wherein at least one jaw member of the plurality of jaw members includes a first engaging arm and a second engaging arm perpendicular to the first engaging arm.

16. A system comprising:
an order processing device to process an order including a plurality of containers; and
a cap device adapted to cap a container of the plurality of containers and connected to the order processing device, the cap device being adapted to receive dispensation preferences from the order processing device, and the cap device including:
a plurality of crown feeders, each crown feeder including a plurality of crown portions, the plurality of crown portions in each crown feeder having a crown portion configuration of a plurality of crown portion configurations, each crown portion configured to interface with a receiving portion to form a cap for capping; and
a capping implement adapted to grasp the crown portion from one of the plurality of crown feeders;
wherein the capping implement includes a first housing, a second housing, and a third housing, the second and third housings being disposed in the first housing and both the second housing and third housing engage the crown portion, wherein the capping implement includes a first spring disposed between the first housing and the second housing and a second spring disposed between the second and third housings, and wherein the first spring is axially spaced from the second spring;
wherein the cap device includes a control unit and the capping implement includes a sensor assembly disposed at the first and second housings, the sensor assembly being adapted to monitor movement of the second and third housings, and wherein the dispensation preferences include at least one of no crown portion required and crown portion required.

17. The system of claim 16, wherein the sensor assembly includes a pin connected to the second housing and extending through a slot in the first housing, and
a sensor adapted to signal when the pin blocks the sensor.

18. The system of claim 16, wherein the sensor assembly includes an extension associated with the second housing and interoperable with the first housing.

19. The system of claim 18, wherein the sensor assembly includes a sensor adapted to send a change state signal when the extension indicates a state change of one of the first housing and the second housing.

* * * * *